United States Patent Office 3,395,078
Patented July 30, 1968

3,395,078
SYNTHESIS OF EQUILIN
Claude Vezina, Oka, Quebec, and Romano Deghenghi, Montreal, Quebec, Canada, assignors to American Home Products Corporation, New York, N.Y., a corporation of Delaware
No Drawing. Filed May 13, 1965, Ser. No. 455,578
6 Claims. (Cl. 195—51)

ABSTRACT OF THE DISCLOSURE

There is disclosed herein a process for preparing equilin comprising microbiological degradation of the $C^{17}$ side-chain of cholesta-5,7-diene-3$\beta$,19-diol diacetate, 19-hydroxy-cholesta-4,7-dien-3-one, 3,19-diacetoxy-cholesta-3,5,7-triene, 10-acetoxycholesta-4,7-dien - 3 - one, 19-hydroxycholesta-5,7-dien-3-one, 17$\beta$-[2'-(6-methylheptyl)]-estra-5(10), 7-dien -3- one and 19-norcholesta-4,7-dien-3-one with concomitant aromatization of ring A without affecting the double bond at 7.8. Cultures of *Bacterium cyclooxidans*, *Mycobacterium rhodochrus*, *Corynebacterium simplex* and *Nocardia corallina* are utilized.

This invention relates to synthese of equilin, a well-known natural estrogen, and to novel intermediates in the preparation theereof.

In particular, it describes pathways to equilin which are, economically advantageous due to the ease of availability of the starting materials, high yields, mild conditions of the transformations, and purity of the product.

Schematically, the reaction may be written as follows:

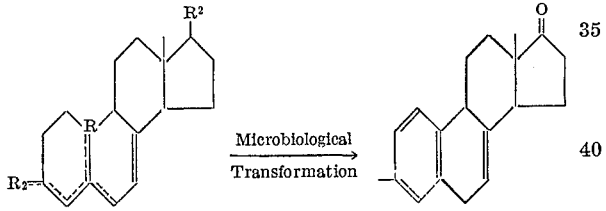

where the dotted lines represent double bonds which may or may not be present; for example, when $R^1$ represents OH, OAcyl, or $OCOCH_3$ the double bonds in position 5–6 or in positions 3–4 and 5–6 may be present and when $R^1$ represents O (ketonic oxygen) the double bonds in positions 4–5 or 5–6 or 5–10 may be present; when R represents C, CH, COAcyl, $CCH_2OH$, or $CCH_2OAcyl$; $R^1$ represents O (ketonic oxygen), OH, or OAcyl; $R^2$ represents $C_8H_{17}$, $C_9H_{19}$, or $C_{10}H_{21}$; when $R^2=C_8H_{17}$ the side-chain is the same as in cholesterol, of the formula:

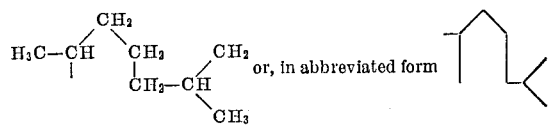

when $R^2=C_9H_{19}$ the side-chain is the same as in campesterol, of the formula

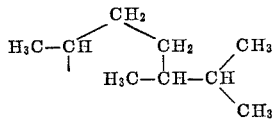

and when $R^2=C_{10}H_{21}$ the side-chain is the same as in $\beta$-sitosterol, of the formula

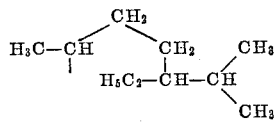

It is a particular advantage of the process of this invention that during the process of microbiological transformation the double bond in positions 7–8 of the substrate is not attacked while the side-chain attached to carbon atom 17 is degraded to a ketonic oxygen function and ring A is concomitantly aromatized, with elimination of the angular group at carbon atom 10 if such group is present in the substrate.

More specifically, the above reactions may be represented by the following formulae, in which $R^3$ represents hydrogen or an acyl group, and Ac represents the acetyl group illustrating the pathways to equilin from derivatives of the cholesterol series:

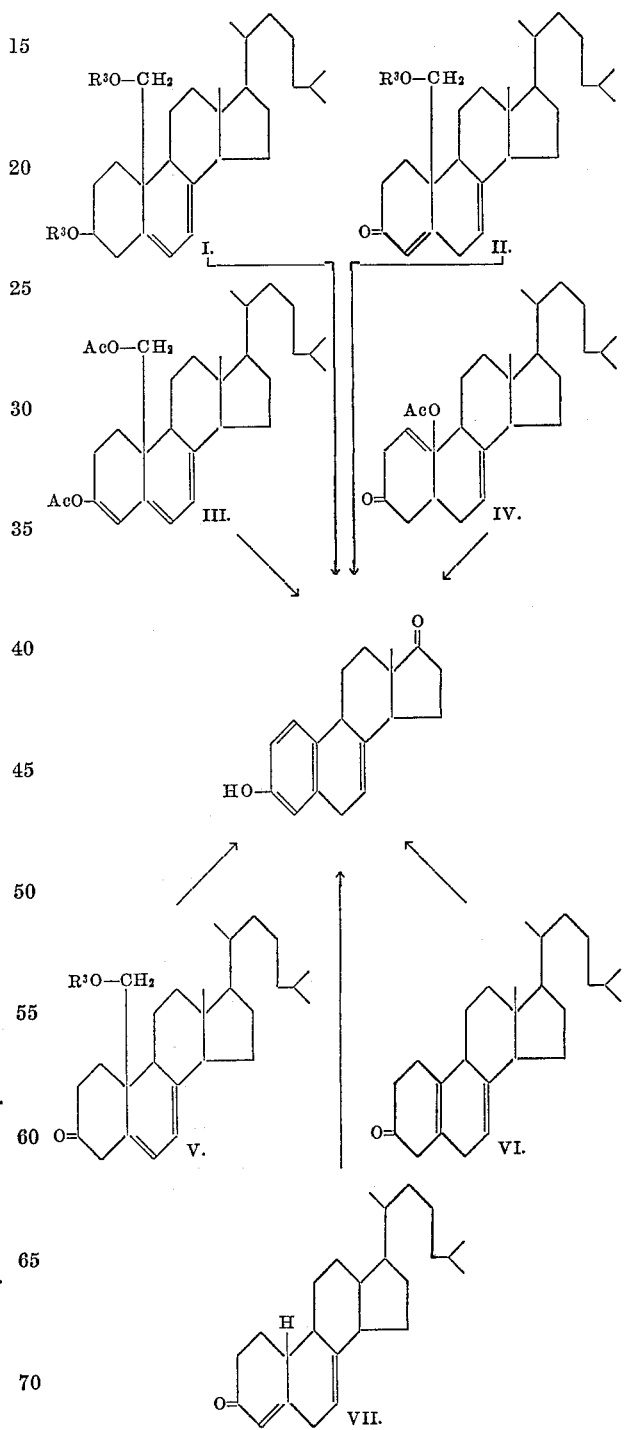

By using any of the above Compounds I to VII inclusive, or by using their respective analogues from the campesterol or the β-sitosterol series as substrates and incubating them in particular with *Bacterium cyclooxidans* ATCC 12673, *Mycobacterium rhodochrus* ATCC 4273, *Corynebacterium simplex* ATCC 6946, *Nocardia corallina* ATCC 999 or ATCC 13259, extracting with a water-insoluble solvent such as, for example, ethylene dichloride, evaporating the solvent, dissolving the residue in chloroform-methanol mixture 1:1, and purifying by chromatography if necessary, equilin is obtained.

The following examples, while not limiting this invention to the compounds and process described, are given as illustration. The procedure carried out in these examples, and the intermediate compounds obtained, are illustrated in the attached flow sheet. This flow sheet illustrates schematically the process starting with Compound I, cholesta-5,7-diene-3β,19-diol diacetate, and proceeding to Compound VII, 19-norcholesta-4,7-dien-3-one, intermediate compounds prepared during the process also being shown thereon.

Example I.—Cholesta-5,7-diene-3β,19-diol diacetate

A mixture of 0.01 M quantity of cholest-5-ene-3β,19-diol diacetate (J. Kalvoda et al., Helv. Chim. Acta. 46, 1361 (1963)) and 2.15 g. of N-bromosuccinimide in 100 ml. carbon tetrachloride is refluxed and irradiated for 5 minutes (photoflood lamp, 500 w.). The cooled mixture is filtered and the filtrate evaporated in vacuo. Collidine (10 ml.) and xylene (50 ml.) are added to the residue and refluxed for 15 minutes. The mixture is taken up in ether, washed to neutrality, and the solvent evaporated, yielding an amorphous material from which cholesta-5,7-diene-3β,19-diol diacetate (I, $R^3$=Ac) is separated by chromatography on silica gel, developing the chromatogram with hexane-ethyl acetate mixtures.

Example II.—19-hydroxychloesta-4,7-dien-3-one

Cholesta-5,7-diene-3β,19-diol diacetate (I) as obtained in Example I is hydrolyzed overnight at room temperature in alcoholic potassium hydroxide (5%) and the corresponding diol (I, $R^3$=H) is subjected to conventional Oppenauer oxidation. Extraction with ether, washing to neutrality, and evaporation of the solvent followed by chromatography gives 19-hydroxycholesta-4,7-dien-3-one (II, $R^3$=H) which is acetylated with pyridine and acetate anhydride at room temperature overnight to give the corresponding acetate, 19-acetoxy-cholesta-4,7-dien-3-one (II, $R^3$=Ac).

Example III.—3,19-diacetoxycholesta-3,5,7-triene 19-acetoxycholesta-4,7-dien-3-one is dissolved in acetic anhydride and refluxed for 1 hour in presence of a catalytic amount of p-toluenesulfonic acid. Extraction with ether, washing to neutrality, and evaporation of the solvent followed by chromatography yields the enol-diacetate 3,19-diacetoxycholesta-3,5,7-triene (III).

Example IV.—10-acetoxycholesta-4,7-dien-3-one

Cholesta-4,7-dien-3-on-19-ol (II, $R^3$=H) as prepared in Example II (1.0 g.) is refluxed in presence of 3.0 g. of lead tetraacetate under nitrogen in toluene for 5 minutes. Extraction with methylene chloride, washing to neutrality, and evaporation of the solvent yields 10-acetoxycholesta-4,7-diene-3-one (IV).

Example V.—19-hydroxycholesta-5,7-dien-3-one

Cholesta-4,7-dien-3-on-19-ol (II, $R^3$=H) as prepared by the method of Example II is dissolved in dimethyl sulfoxide and treated at room temperature under nitrogen with 3 parts by weight of sodium methoxide. The mixture is quenched with aqueous acetic acid (2.5 ml. in 50 ml. water) and the title compound extracted with ether, the solution washed to neutrality, dried and evaporated to yield 19-hydroxycholesta-5,7-dien-3-one (V, $R^3$=H).

Example VI.—17β-[2'-(6'-methylheptyl)]-estra-5(10),7-dien-3-one

Cholesta-4,7-dien-3-on-19-ol (II, $R^3$=H), as prepared in Example II, is stirred at room temperature for 16 hours with an equal weight of zinc dust in glacial acetic acid. Filtration, dilution with water, extraction with ether, washing to neutrality followed by evaporation of the solvent yields 17β - [2' - (6' - methylheptyl)] - estra 5(10),7-dien-3-one (VI).

Example VII.—19-norcholesta-4,7-dien-3-one

17β - [2' - (6' - methylheptyl)] - estra - 5(10),7 - dien-3-one, as obtained in Example VI, is stirred at room temperature in methanolic solution containing hydrochloric acid for 15–30 minutes. Dilution with water, extracting with ether, washing to neutrality and evaporation of the solvent yields 19-norcholesta-4,7-dien-3-one (VII). In the same manner, by using 1% potassium hydroxide in methanol instead of hydrochloric acid, 19-norcholesta-4,7-dien-3-one (VII) is also obtained.

Example VIII.—Equilin

Erlenmeyer flasks (250 ml. size), containing 50 ml. of a conventional medium having pH 6.5 (made up of a commercial glucose preparation, "Cerelose," 20 g.; a protein hydrolysate, "Edamin," 20 g.; corn steep liquor 5 g.; distilled water 1000 ml.) are inoculated with *Bacterium cyclooxidans* ATCC 12673 and incubated for 42 hours at 25° C. The bacterial culture is centrifuged and re-suspended in 0.03 molar phosphate buffer of pH 7.0. A sample of cholesta-5,7-diene-3β,19-diol diacetate, prepared as in Example I, dissolved in acetone is charged into the culture suspension to a final concentration of 300 μg./ml. and incubated for 1 to 5 days. The bacterial culture is removed by centrifugation, the beer extracted with ethylene dichloride, the extracts dried and evaporated. Chromatography on silica gel yields equilin.

By using the procedure described above, but substituting 19-hydroxycholesta-4,7-dien-3-one, 3,19-diacetoxycholesta - 3,5,7 - triene, 10 - acetoxycholesta - 4,7 - dien-3 - one, 19 - hydroxycholesta - 5,7 - dien - 3 - one, 17β-[2' - (6' - methylheptyl)] - estra - 5(10),7 - dien - 3 - one, or 19-norcholesta-4,7-dien-3-one for cholesta-5,7-diene-3β,19-diol diacetate, and working up in the same manner as described above, equilin is also obtained.

Example IX.—Equilin

Erlenmeyer flasks (250 ml. size), containing 50 ml. of a conventional medium having pH 6.45 (made up of a commercial glucose preparation, "Cerelose," 20 g.; a protein hydrolysate, "Edamin," 20 g.; corn steep liquor 5 g.; distilled water 1000 ml.) are inoculated with *Mycobacterium rhodochrus* ATCC 4273 and incubated for 42 hours at 25° C. The bacterial culture is centrifuged and re-suspended in 0.03 molar phosphate buffer of pH 7.0. A sample of cholesta-5,7-diene-3β,19-diol diacetate, prepared as in Example I, dissolved in acetone is charged into the culture suspension to a final concentration of 300 μg./ml. and incubated for 2–4 days. The bacterial culture is removed by centrifugation, the beer extracted with ethylene dichloride, the extracts dried and evaporated. Chromatography on silica gel and idevelopment with 20% ethyl acetate in carbon tetrachloride yields equilin.

By using the procedure described above, but substituting 19 - hydroxycholesta-4,7-dien-3-one, 3,19 - diacetoxycholesta-3,5,7-triene, 10 - acetoxycholesta-4,7-dien-3-one, 19-hydroxycholesta-5,7-dien-3-one, 17β-[2' - (6' - methylheptyl)]-estra-5(10),7-dien-3-one, or 19-norcholesta-4,7-dien-3-one for cholesta-5,7-diene-3β,19-diol diacetate, and working up in the same manner as described above, equilin is also obtained.

Example X.—Equilin

Erlenmeyer flasks (250 ml. size), containing 50 ml. of a conventional medium having pH 6.5 (made up of a commercial glucose preparation, "Cerelose," 20 g.; a protein hydrolysate, "Edamin," 20 g.; corn steep liquor 5 g.; distilled water 1000 ml.) are inoculated with *Corynebacterium simplex* ATCC 6946, and incubated for 42 hours at 25° C. The bacterial culture is centrifuged and re-suspended in 0.03 molar phosphate buffer of pH 7.0. A sample of cholesta-5,7-diene-3β,19-diol diacetate, prepared as in Example I, dissolved in acetone is charged into the culture suspension to a final concentration of 300 μg./ml. and incubated for 2 to 5 days. The bacterial culture is removed by centrifugation, the beer extracted with ethylene dichloride, the extracts dried and evaporated. Chromatography on silica gel and development with 10% collidine in carbon tetrachloride yields equilin.

By using the procedure described above, but substituting 19 - hydroxycholesta-4,7-dien-3-one, 3,19 - diacetoxycholesta-3,5,7-triene, 10 - acetoxycholesta-4,7-diene-3-one, 19 - hydroxycholesta-5,7-dien-3-one, 17β-[2'-(6'-methylheptyl)]-estra-5(10),7-dien-3-one, or 19 - norcholesta-4,7-dien-3-one for cholesta-5,7-diene-3β,19-diol diacetate, and working up in the same manner, as described above, equilin is also obtained.

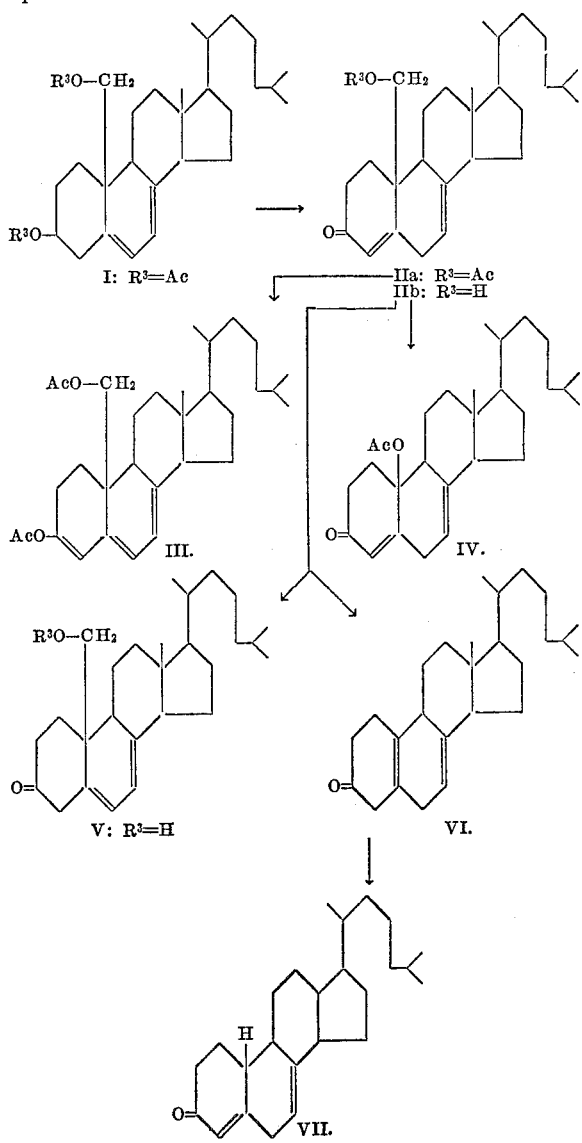

Example XI.—Equilin

Erlenmeyer flasks (250 ml. size), containing 50 ml. of a conventional medium having pH 6.4 (made up of a commercial glucose preparation, "Cerelose," 20 g.; a protein hydrolysate, "Edamin," 20 g.; corn steep liquor 5 g.; distilled water 1000 ml.) are inoculated with *Nocardia corallina* ATCC 999 and incubated for 42 hours at 25° C. The bacterial culture is centrifuged and re-suspended in 0.03 molar phosphate buffer of pH 7.0. A sample of cholesta-5,7-diene-3β,19-diol diacetate prepared as in Example I, dissolved in acetone is charged into the culture suspension to a final concentration of 300 μg./ml. and incubated for 3 to 5 days. The bacterial culture is removed by centrifugation, the beer extracted with ethylene dichloride, the extracts dried and evaporated. Chromatography on silica gel and development with 15% collidine in carbon tetrachloride yields equilin.

In the same manner, by using a culture of *Nocardia corallina* ATCC 13259, equilin is also obtained.

By using the procedure described above, but substituting 19 - hydroxycholesta-4,7-dien-3-one, 3,19 - diacetoxycholesta-3,5,7-triene, 10 - acetoxycholesta-4,7-dien-3-one, 19 - hydroxycholesta-5,7-dien-3-one, 17β-[2'-(6'-methylheptyl)]-estra-5(10),7-dien-3-one, or 19 - norcholesta-4,7-dien-3-one for cholesta-5,7-diene-3β,19-diol diacetate, and working up in the same manner as described above, equilin is also obtained.

We claim:
1. The process for preparing equilin from a starting material selected from the group which consists of cholesta-5,7-diene-3β,19diol diacetate, 19-hydroxycholesta-4,7-dien - 3-one, 3,19-diacetoxycholesta-3,5,7-triene, 10-acetoxycholesta-4,7-dien-3-one, 19 - hydroxycholesta-5,7 - dien-3-one, 17β-[2'-6-methylheptyl)]-estra-5(10),7-dien-3-one and 19-norcholesta-4,7-dien-3-one which comprises subjecting said starting material to the enzymatic activity of a microorganism selected from the group which consists of *Bacterium cyclooxidans*, *Mycobacterium rhodochrus*, *Corynebacterium simplex* and *Nacardia corallina*; and recovering equilin from the culture medium.

2. The process as defined in claim 1 wherein said starting material is subjected to the enzymatic activity of *Bacterium cyclooxidans* ATCC 12673.

3. The process as defined in claim 1 wherein said starting material is subjected to the enzymatic activity of *Mycobacterium rhodochrus* ATCC 4273.

4. The process as defined in claim 1 wherein said starting material is subjected to the enzymatic activity of *Corynebacterium simplex* ATCC 6946.

5. The process as defined in claim 1 wherein said starting material is subjected to the enzymatic activity of *Nocardia corallina* ATCC 999.

6. The process as defined in claim 1 wherein said starting terminal is subjected to the enzymatic activity of *Nocardia corallina* ATCC 13259.

References Cited

UNITED STATES PATENTS 2,902,410  9/1959  Weintraub et al. _____ 195—51

ALVIN E. TANENHOLTZ, *Primary Examiner.*

UNITED STATES PATENT OFFICE
CERTIFICATE OF CORRECTION

Patent No. 3,395,078           July 30, 1968

Claude Vezina et al.

It is certified that error appears in the above identified patent and that said Letters Patent are hereby corrected as shown below:

Column 1, lines 33 to 43, the left-hand formula should appear as shown below:

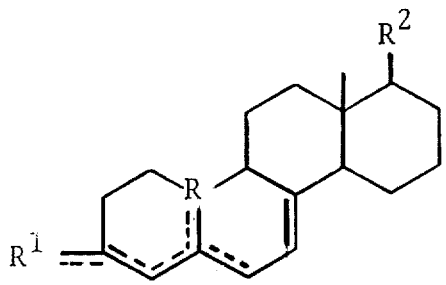

Column 2, lines 25 to 35, the formula should appear as shown below:

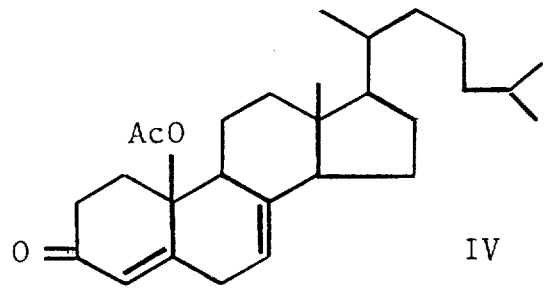

Column 6, line 32, "19-hydroxychlo-" should read -- 19-hydroxycho- --.

Signed and sealed this 10th day of March 1970.

(SEAL)
Attest:

EDWARD M. FLETCHER, JR.      WILLIAM E. SCHUYLER, JR.
Attesting Officer         Commissioner of Patents